United States Patent
Naguib et al.

(10) Patent No.: US 9,824,481 B2
(45) Date of Patent: Nov. 21, 2017

(54) MAINTAINING HEATMAPS USING TAGGED VISUAL DATA

(71) Applicant: QUALCOMM Incorporated, San Diego, CA (US)

(72) Inventors: Ayman Fawzy Naguib, Cupertino, CA (US); Hui Chao, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/585,538

(22) Filed: Dec. 30, 2014

(65) Prior Publication Data

US 2016/0189416 A1 Jun. 30, 2016

(51) Int. Cl.
| | | |
|---|---|---|
| *G06T 11/20* | (2006.01) | |
| *G06T 15/00* | (2011.01) | |
| *H04W 4/02* | (2009.01) | |
| *G06F 17/30* | (2006.01) | |
| *G06K 9/46* | (2006.01) | |
| *H04N 5/00* | (2011.01) | |
| *G01S 5/02* | (2010.01) | |

(52) U.S. Cl.
CPC ............ *G06T 15/00* (2013.01); *G01S 5/0252* (2013.01); *G06F 17/30268* (2013.01); *G06K 9/46* (2013.01); *H04N 5/00* (2013.01); *H04W 4/02* (2013.01)

(58) Field of Classification Search
USPC ....................................................... 345/441
See application file for complete search history.

(56) References Cited

U.S. PATENT DOCUMENTS

| | | | | |
|---|---|---|---|---|
| 5,844,505 A | * | 12/1998 | Van Ryzin | ......... G01C 21/3602 340/905 |
| 6,133,947 A | * | 10/2000 | Mikuni | .............. G01C 21/3647 348/101 |
| 6,970,189 B1 | | 11/2005 | Bernstein et al. | |

(Continued)

FOREIGN PATENT DOCUMENTS

WO    2011144967 A1    11/2011

OTHER PUBLICATIONS

International Search Report and Written Opinion—PCT/US2015/067674—ISA/EPO—dated Mar. 30, 2016.

(Continued)

*Primary Examiner* — Ryan R Yang
(74) *Attorney, Agent, or Firm* — Kilpatrick Townsend & Stockton

(57) ABSTRACT

Techniques describe tagging visual data (e.g., image and/or video data) with wireless and sensor measurement information by a mobile device. Tagged visual data may be sent to a server, such as a crowdsourcing server. Techniques further describe receiving visual data from a device, wherein the visual data is tagged with information comprising source identifying information associated with an at least one signal emitting device, identifying at least one visual feature from the visual data, determining a coordinate on a map at which the visual data was acquired based on identifying the at least one visual feature from the visual data, and associating the coordinate on the map with the information associated with the at least one signal emitting device.

26 Claims, 12 Drawing Sheets

(56) References Cited

U.S. PATENT DOCUMENTS

| | | | |
|---|---|---|---|
| 8,386,422 B1* | 2/2013 | Kadous | G01C 21/206 455/456.1 |
| 8,803,991 B2 | 8/2014 | Konda | |
| 8,818,706 B1 | 8/2014 | Ogale et al. | |
| 9,084,013 B1 | 7/2015 | Arini et al. | |
| 2003/0222796 A1* | 12/2003 | Nagasaki | G01C 21/3602 340/995.1 |
| 2005/0037775 A1 | 2/2005 | Moeglein et al. | |
| 2007/0073937 A1 | 3/2007 | Feinberg et al. | |
| 2007/0127833 A1 | 6/2007 | Singh | |
| 2008/0068456 A1 | 3/2008 | Fujii et al. | |
| 2008/0151058 A1 | 6/2008 | Xu et al. | |
| 2008/0254808 A1 | 10/2008 | Rekimoto | |
| 2009/0023472 A1 | 1/2009 | Yoo et al. | |
| 2009/0051785 A1 | 2/2009 | Kamada et al. | |
| 2010/0225756 A1* | 9/2010 | Miyata | G01C 21/3602 348/116 |
| 2010/0235091 A1 | 9/2010 | Das et al. | |
| 2010/0251101 A1 | 9/2010 | Haussecker et al. | |
| 2010/0268451 A1* | 10/2010 | Choi | G01C 21/3602 701/533 |
| 2011/0046881 A1* | 2/2011 | Karaoguz | G01C 21/32 701/532 |
| 2011/0058802 A1 | 3/2011 | Forutanpour et al. | |
| 2011/0159921 A1 | 6/2011 | Davis et al. | |
| 2011/0267492 A1 | 11/2011 | Prentice et al. | |
| 2012/0046042 A1 | 2/2012 | Son | |
| 2012/0086825 A1 | 4/2012 | Yost et al. | |
| 2012/0236173 A1 | 9/2012 | Telek et al. | |
| 2012/0308081 A1* | 12/2012 | Sato | G01S 5/0252 382/103 |
| 2013/0045751 A1 | 2/2013 | Chao et al. | |
| 2013/0101163 A1 | 4/2013 | Gupta et al. | |
| 2013/0116968 A1 | 5/2013 | Wirola et al. | |
| 2013/0121173 A1 | 5/2013 | Chen et al. | |
| 2013/0190018 A1 | 7/2013 | Mathews | |
| 2013/0196681 A1* | 8/2013 | Poduri | H04W 64/00 455/456.1 |
| 2013/0222369 A1 | 8/2013 | Huston et al. | |
| 2013/0230208 A1 | 9/2013 | Gupta et al. | |
| 2013/0235222 A1 | 9/2013 | Karn et al. | |
| 2013/0297321 A1* | 11/2013 | Raux | G01C 21/26 704/275 |
| 2013/0322767 A1 | 12/2013 | Chao et al. | |
| 2013/0344886 A1 | 12/2013 | Jarvis et al. | |
| 2013/0346431 A1 | 12/2013 | Erol et al. | |
| 2014/0009612 A1 | 1/2014 | King | |
| 2014/0011518 A1 | 1/2014 | Valaee et al. | |
| 2014/0052401 A1* | 2/2014 | Riley | G01P 21/00 702/89 |
| 2014/0153773 A1 | 6/2014 | Gupta et al. | |
| 2014/0171128 A1 | 6/2014 | Bernhardt et al. | |
| 2014/0179341 A1 | 6/2014 | Sydir et al. | |
| 2014/0218544 A1 | 8/2014 | Senot et al. | |
| 2014/0274114 A1 | 9/2014 | Rowitch | |
| 2014/0315570 A1 | 10/2014 | Yun et al. | |
| 2015/0045072 A1* | 2/2015 | Chao | G01S 19/42 455/456.6 |
| 2015/0153191 A1* | 6/2015 | Ma | G01C 21/34 701/426 |
| 2016/0188540 A1 | 6/2016 | Naguib et al. | |
| 2016/0191775 A1 | 6/2016 | Naguib et al. | |

OTHER PUBLICATIONS

Assam A., "Sensor-Enhanced Imaging," University of Birmingham, Dec. 2012, 251 Pages.

International Search Report and Written Opinion—PCT/US2015/061479—ISA/EPO—dated Feb. 4, 2016.

* cited by examiner

| Location XYZ | |
|---|---|
| AP-1 MAC ADDRESS | RSSI/RTT$_{(xyz-AP-1)}$ |
| AP-2 MAC ADDRESS | RSSI/RTT$_{(xyz-AP-2)}$ |
| AP-3 MAC ADDRESS | RSSI/RTT$_{(xyz-AP-3)}$ |
| AP-4 MAC ADDRESS | RSSI/RTT$_{(xyz-AP-4)}$ |

FIG. 3

MAINTAINING HEATMAPS USING TAGGED VISUAL DATA

TECHNICAL FIELD

The present disclosure generally relates to enabling location based services, and more specifically, machine-based visual data acquisition and processing for enabling location based services.

BACKGROUND

For mobile devices, there are countless applications that take advantage of a location fix of the mobile device for location based services. For example, a map application can select appropriate maps, direction, driving routes, etc., based on the current location of the mobile device. A social networking application can identify other users within the vicinity based on the location of the device. Many other examples exist. Different techniques for obtaining a position fix for a mobile device may be appropriate under different conditions. In an outdoor environment, satellite-based approaches, i.e., GNSS (Global Navigation Satellite System) techniques may be suitable, because the mobile device may be able to receive satellite-based positioning signals with specific timing requirements. Based on reception of such satellites signals, a position fix for the mobile device may be calculated. However, in some instances satellite-based approaches are not satisfactory for environments where the mobile device does not have a direct line of sight to sufficient number of GNSS satellites. Such environments include indoor environments, urban canyons, etc.

Generally, techniques are described herein for improving location detection in such environments and other solutions.

SUMMARY

The present disclosure generally relates to enabling location based services, and more specifically, machine-based visual data acquisition and processing for enabling location based services.

Techniques describe tagging visual data (e.g., image and/or video data) with wireless and sensor measurement information by the mobile device. In some implementations, additional metadata fields may be used for tagging visual data with wireless and/or sensor measurement information. The tagged visual data may be sent to a server, such as a crowdsourcing server, where the crowdsourcing server may derive the location the image was captured at using visual features from the visual data and optionally sensor information included in the file. The crowdsourcing server may extract the information associated with the wireless signal emitting device and associate the location coordinate on a heatmap with the information associated with the wireless signal emitting device.

An example method for generating map data may include receiving visual data from a device, wherein the visual data is tagged with information comprising source identifying information associated with an at least one signal emitting device, identifying at least one visual feature from the visual data, determining a location of the device at which the visual data was acquired based on identifying the at least one visual feature from the visual data, determining a coordinate on a map using the determined location, and associating the coordinate on the map with the information associated with the at least one signal emitting device. In one aspect, the map may be for a GNSS-denied environment.

In one implementation, the information associated with the at least one signal emitting device further may include signal strength of an at least one wireless signal from the at least one signal emitting device measured at the device. In another implementation, the information associated with the at least one signal emitting device may further include a round-trip time derived using at least one wireless signal from the at least one signal emitting device.

In certain implementations, the visual data may be further tagged with barometer information, magnetometer information and/or motion data associated with the device. In one aspect, determining the location of the device at which the visual data was acquired using a camera coupled to the device may include using the magnetometer, barometer or motion data information from the device.

In certain aspects, the at least one signal emitting device may be a wireless access point and the source identifying information associated with the at least one signal emitting device may be a media access control (MAC) address. In one aspect, the location of the at least one signal emitting device may be unknown at least at a time the visual data is acquired using a camera.

In one example, the visual data may be an image file formatted according to Exchangeable Image File Format (Exif) and tagging the visual data may comprise including the information associated with the at least one signal emitting device as part of metadata for the image file. In another example, the visual data may be a video.

An example server computing device may include a transceiver configured to receive visual data acquired by a device, wherein the visual data may be tagged with information comprising source identifying information associated with an at least one signal emitting device and a memory configured to store the visual data and the tag. Furthermore, the example server device may include one or more processors configured to identify at least one visual feature from the visual data, determine a location of the device at which the visual data was acquired based on identifying the at least one visual feature from the visual data, determine a coordinate on a map using the determined location, and associate the coordinate on the map with the information associated with the at least one signal emitting device. In one example, the map may be for a GNSS-denied environment.

An example apparatus may include means for receiving visual data from a device, wherein the visual data is tagged with information comprising source identifying information associated with an at least one signal emitting device, means for identifying at least one visual feature from the visual data, means for determining a location of the device at which the visual data was acquired based on identifying the at least one visual feature from the visual data, means for determining a coordinate on a map using the determined location, and means for associating the coordinate on the map with the information associated with the at least one signal emitting device.

An example non-transitory computer-readable storage medium, wherein the non-transitory computer-readable storage medium comprises instructions executable by a processor, the instructions may include instructions to receive visual data from a device, wherein the visual data is tagged with information comprising source identifying information associated with an at least one signal emitting device, identify at least one visual feature from the visual data, determine a location of the device at which the visual data was acquired based on identifying the at least one visual feature from the visual data, determine a coordinate on a map using the determined location, and associate the coordinate on the map with the information associated with the at least one signal emitting device.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 3 illustrates an example data structure for associating a location with wireless information for a location on a heatmap.

DETAILED DESCRIPTION

Figure 1:
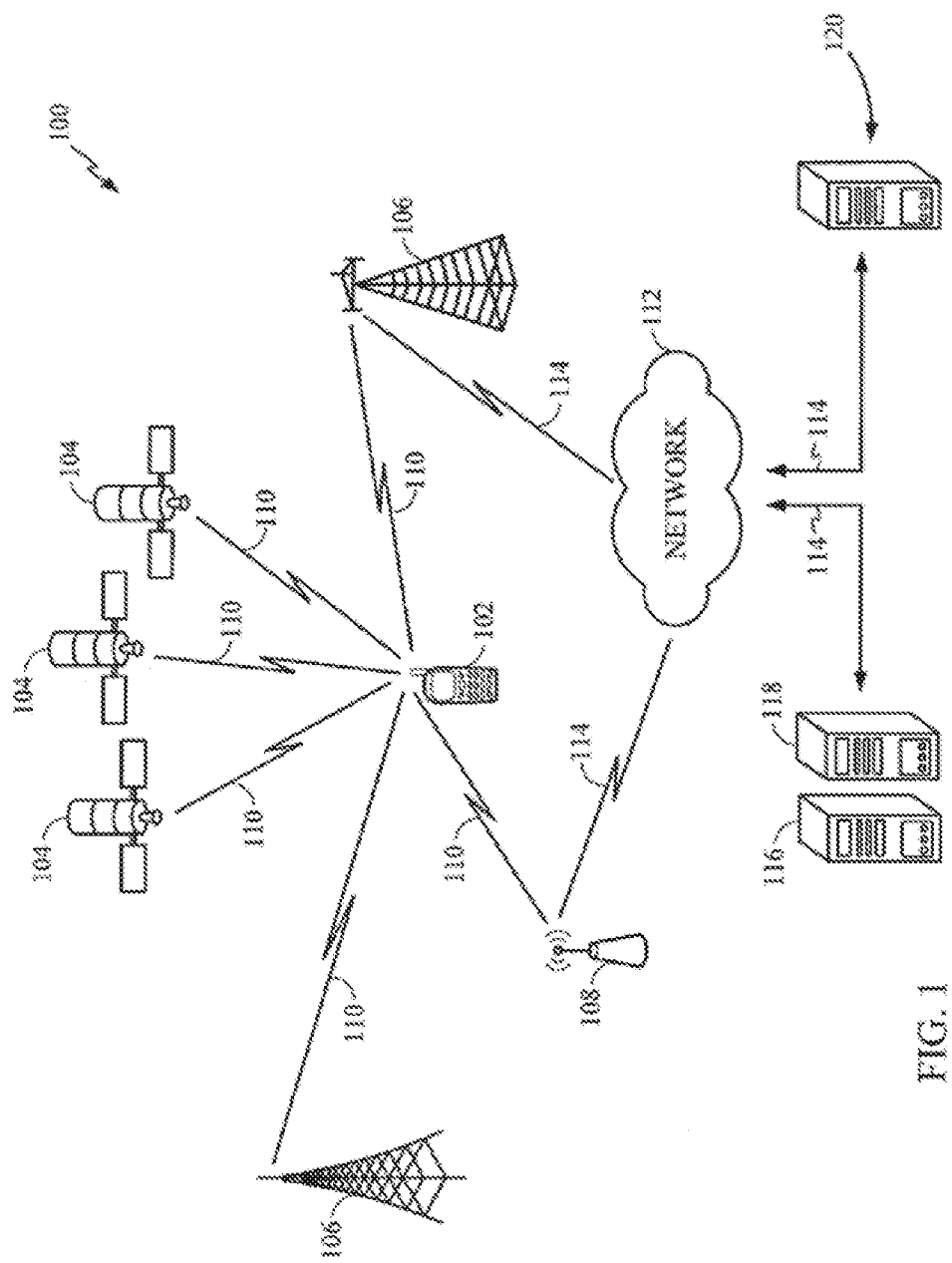
FIG. 1 is a schematic diagram illustrating features associated with an implementation of an example operating environment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

For mobile devices, there are countless applications that take advantage of the location fix of the device for location based services. For example, a map application can select appropriate maps, direction, driving routes, etc., based on the current location of the mobile device. A social networking application can identify other users within the vicinity based on the location of the device. Many other examples exist. Different techniques for obtaining a position fix for a mobile device may be appropriate under different conditions. In an outdoor environment, satellite-based approaches, i.e., GNSS (Global Navigation Satellite System) techniques may be suitable because the mobile device may be able to receive satellite-based positioning signals with specific timing requirements. Based on reception of such satellite signals, a position fix for the mobile device may be calculated. However, in some instances satellite-based approaches are not satisfactory for environments where the mobile device does not have a direct line of sight to sufficient number of GNSS satellites. Such environments may be referred to as GNSS-denied environments and may include indoor environments (e.g., shopping mall, airport, sports arena, etc.) and outdoor environments (urban canyons, etc.).

In such GNSS-denied environments where the mobile device does not have a direct line of sight to sufficient number of satellites, Access Point (AP)-based approaches are generally more useful for obtaining a location fix for a mobile device. The mobile device observes signals sent to and/or from APs at known locations. Different types of measurements may be obtained, such as RSSI (Received Signal Strength Indication) and RTT (Round-trip Time) at the mobile device. The mobile device may compare these measurements against a map that associates wireless measurements with locations (also referred to as heatmaps) to determine the location of the device. In one example, the mobile device may download the heatmap from a remote server (i.e., heatmap server) for the specific location the mobile device is at.

However, generating heatmaps for innumerable locations with unsatisfactory satellite coverage and keeping those maps updated is a challenging task. For example, generating the heatmap may require that a technician manually visits each indoor location and creates a mapping between the wireless measurements at the location and the location itself. Furthermore, as the APs are removed, added or moved, the wireless measurements at each location may change, outdating the information associated with the heatmaps. Periodically, updating the heatmap may require that the technician revisit the indoor location and recreate the association between the wireless measurements and locations.

Embodiments of the invention generally describe tagging visual data (e.g., image and/or video data) with wireless and sensor measurement information by the mobile device. Visual data may refer to images and/or videos that include visual features. Visual features may refer to one or more visual elements capable of being identified or recognized based, at least in part, on their relatively uniform representation or consistency of use, in commerce or otherwise. In some implementations, additional metadata fields may be used for tagging visual data with wireless and/or sensor measurement information. Generally, metadata describes the attributes associated with the image. For example, the metadata for an Exchangeable image file format (Exif) may include format of the file, the device used to capture the image, date and time, resolution of the image, exposure, focal length, flash, etc.

Embodiments also describe expanding the current format dictated by the standards for image (e.g., Exif) and video formats (mediaObject metadata) to include wireless and sensor measurements in the metadata. Examples of wireless information may include, but is not limited to, wireless wide area network (WWAN) measurements and Wi-Fi measurements. Wi-Fi measurements may include RSSI and RTT measurements. Sensor information may include barometer, magnetometer and motion sensor (e.g., accelerometer, gyroscope, etc.) information. The mobile device may transmit the tagged visual data to a crowdsourcing server.

The crowdsourcing server receives the tagged visual data from the mobile device and identifies one or more visual features (e.g., storefront logo) from the image and determines the location at which the image was captured based on the identified feature. That is, the crowdsourcing server performs image-based location estimation. For example, the crowdsourcing server 116 may identify the storefront logo (e.g., JCrew) for a store from the image. The crowdsourcing server may also estimate the angle at which the image was captured and the distance of the mobile device from the logo, based on the orientation of the logo in the image, the shape of the logo in the image and the size of the logo. In this manner, the crowdsourcing server determines the location at which the image was captured based on the visible features in the image.

Now that the crowdsourcing server knows the approximate location at which the image was captured, the crowdsourcing server extracts the wireless (e.g., Wi-Fi) measurements from the image metadata and associates those wireless measurements with the location on the heatmap 200. As more and more devices send images with wireless measurements over a period of time, the crowdsourcing server continues to associate locations on the heatmap with wireless measurements and consequently refining and automatically updating the heatmap over time.

At a later point in time, the crowdsourcing server may make the heatmap available to various mobile devices. Updated and robust heatmaps from the crowdsourcing server enable the mobile devices to determine their location based on the wireless measurements acquired by the mobile device and matching the wireless measurements against the heatmap.

Information associated with other sensors tagged to the image may also be helpful. For example, in a multi-level building, barometer readings may help determine the level of the building at which the mobile device captured the image.

FIG. 1 is a schematic diagram illustrating features associated with an implementation of an example operating environment 100 capable of facilitating or supporting one or more processes or operations for position estimation of a mobile device 102. It should be appreciated that operating environment 100 is described herein as a non-limiting example that may be implemented, in whole or in part, in the context of various communications networks or combination of networks, such as public networks (e.g., the Internet, the World Wide Web), private networks (e. g., intranets), wireless local area networks (WLAN, etc.), or the like.

It should also be noted that although the subject matter is described providing examples related to indoor implementations, embodiments of the invention are not limited to indoor implementations. In some example scenarios, embodiments of the invention may be operable in a GNSS-denied (or United States Global Positioning System (GPS)-denied) environment. A GNSS-denied environment may refer to any environment where using GNSS satellites for obtaining a position fix for a mobile device may not be possible or may be unsatisfactory. Such GNSS-denied environments may include indoor environments, such as a shopping mall, airport, sports arena, etc., but also outdoor locations, such as urban canyons, town squares, amphitheaters, parking garages, rooftop gardens, patios, etc., where it is difficult for a mobile device to have a line of sight with sufficient GNSS satellites to obtain a position fix.

As illustrated, operating environment 100 may comprise, for example, one or more satellites 104, base transceiver stations 106, wireless signal emitting devices 108 (only one wireless signal emitting device 108 illustrated in FIG. 1 for ease of illustration, but it is understood that the operating environment 100 may include multiple signal emitting devices 108 and will generally include at least one wireless signal emitting device 108), etc., capable of communicating with mobile device 102 via wireless communication links 110 in accordance with one or more communication protocols. Satellites 104 may be associated with one or more GNSS satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Although, in describing some embodiments, for simplicity and illustration purposes a GPS or GNSS-denied environment is discussed, other satellite positioning systems may be substituted without departing from the scope of the invention. Base transceiver stations 106, wireless signal emitting devices 108, etc., may be of the same or similar type, for example, or may represent different types of devices, such as Access Points, radio beacons, cellular base stations, femtocells, or the like, depending on an implementation. At times, one or more signal emitting devices, for example, may be capable of transmitting as well as receiving wireless signals. In some instantiations, wireless signal emitting devices 108, may also include devices configurable to emit signals such as Wi-Fi signal, audible and non-audible sound, and (visible and non-visible) light rays.

In some instances, one or more base transceiver stations 106, signal emitting devices 108, etc., may, for example, be operatively coupled to a network 112 that may comprise one or more wired or wireless communications or computing networks capable of providing suitable or desired information, such as via one or more communication links 114. As will be seen, information may include, for example, assistance information associating relevant places of interests (POIs) with known locations within an indoor or like area of interest and brand specific visual signatures attributed to these POIs, just to illustrate one possible implementation. At times, assistance information may include, for example, identities or locations of one or more base transceiver stations 106, wireless signal emitting devices 108, or the like to facilitate or support one or more operations or processes associated with operating environment 100. As a way of illustration, assistance information may, for example, be provided in the form of a digital map, look-up table, mathematical formula, suitable model, algorithm, etc., which may depend, at least in part, on an application, network, environment, or the like. In an implementation, network 112 may be capable of facilitating or supporting communications between suitable computing platforms or devices, such as, for example, mobile device 102, one or more base transceiver stations 106, wireless signal emitting devices 108, as well as one or more servers associated with operating environment 100.

In some instances, servers may include, for example, a crowdsourcing server 116, a heatmap distribution server 118, as well as one or more other servers, indicated generally as 120 (e.g., navigation, information, map, server, etc.), capable of facilitating or supporting one or more operations or processes associated with operating environment 100.

In some scenarios, the heatmap distribution server 118 may distribute heatmaps to mobile devices 102 operating in the operating environment 100. In some instances, the heatmaps are automatically distributed to mobile devices entering a region supported by the heatmap distribution server 118. In other embodiments, the mobile device 102 requests and downloads the applicable heatmap for the region that the mobile device is either operating in or will be operating in. In one example scenario, the mobile device 102 may use a heatmap to determine its location in an operating environment 100. In one example implementation, the mobile device 102 observes signals sent to and/or from signal emitting devices (such as access points) at known locations. Different types of measurements may be obtained, such as RSSI and RTT at the mobile device. The mobile device may compare these measurements against a heatmap that associates wireless measurements with locations to determine the location of the device.

Embodiments of the invention also describe techniques for gathering information using crowdsourcing for generating, updating and maintaining heatmaps using a crowdsourcing server 116. The crowdsourcing server 116 may be used for collecting information from a plurality of mobile devices and updating a heatmap.

Figure 2:
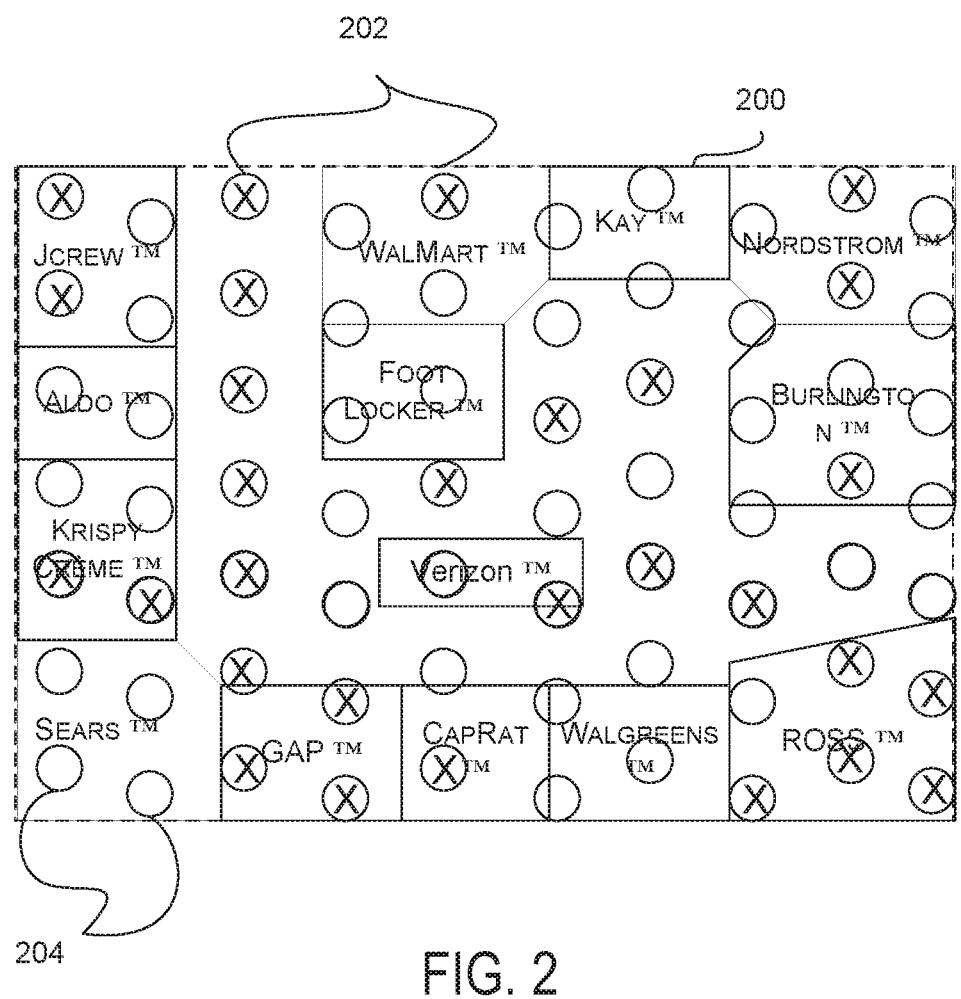
FIG. 2 illustrates a simplified example visual representation of a heatmap for a shopping mall.

FIG. 2 illustrates a simplified example of a visual representation of a heatmap for a shopping mall. A heatmap may be generated, maintained and updated by a crowdsourcing server 116 and distributed to the mobile device 102 by the heatmap distribution server 118. The heatmap 200 may enable a mobile device in determining its location in a GNSS-denied environment using wireless signal information from neighboring signal emitting devices. In one implementation, the heatmap 200, as shown in FIG. 2, may associate location information, such as coordinates on a map, with wireless measurement information, such as RSSI and RTT information associated with signal emitting devices 108, such as APs. In FIG. 2, the oval circles (i.e., 202, 204 may each represent location coordinates associated with the heatmap 200. For each location coordinate, information associated with that location coordinate may include the location and source identifying information associated with the one or more signal emitting devices 108. In addition, in some implementations, the information associated with the location may also include measurements associated with the signal from the signal emitting device 108. An example implementation of the information associated with each location coordinate or node on a heatmap 200 is further described in FIG. 3. In one implementation, the oval circles marked with 'X' mark (204) represent locations with actual measurements from one or more mobile devices that collected information from those respective locations in the past, whereas the oval circles without the 'X' mark (202) may represent data interpolated from neighboring locations. In some instances, with the number of actual measurements, the overall accuracy of the heatmap increases.

The crowdsourcing server 116 may generate, update and maintain such heatmaps for several GNSS-denied environments. At a different point in time, the crowdsourcing server 116 may make the heatmap 200 available to various mobile devices. Either automatically, or upon request from the mobile device 102, the heatmap distribution server 118 may distribute the heatmap to the mobile device 102. In some instances, the heatmap may be distributed to the mobile device in advance of the mobile device's visit to the GNSS-denied environment, or if the mobile device 102 frequently visits the GNSS-denied environment. Updated and robust heatmaps from the crowdsourcing server 116 and heatmap distribution server 118 are made available to mobile device and enable the mobile devices to determine their location, especially in a GNSS-denied environment.

FIG. 3 illustrates an example data structure for associating a location with example wireless information measured at a location. In one example, each node depicted as an oval circle in the heatmap of FIG. 2 may comprise a similar data structure 300 that associates the location with access point information. As shown in FIG. 3, at a given location XYZ 302, the heatmap 200 may have information associated with four different signal access points (APs). The information associated with the four different APs may include RSSI and/or RTT information measured by one or more representative mobile devices at location XYZ 302 for each of the four APs. In alternative implementations, or in addition to RSSI and/or RTT measurements, the data structure 300 may include any information that is measurable and changes proportionally to the distance between the AP and a representative mobile device located at location XYZ 302.

In FIG. 3, the data structure 300 has four entries for four APs representing the measurement performed or interpolated for location XYZ 302. Each entry may have a source identifying field and a measurement field. For example, for AP-1, the first entry has the AP-1 media access control (MAC) address 304 and the RSSI and/or the RTT information for AP-1 for a representative device measuring the RSSI/RTT at location XYZ 302 (block 306). Similarly for AP-2, AP-3 and AP-4, the second, third and fourth entries have their respective MAC addresses (308, 312 and 316) and respective RSSI/RTT measurements for the respective APs (310, 314 and 318) when measured from a representative mobile device at location XYZ 302.

In FIG. 3, the MAC address serves as a unique source identifier for each of the APs. Any other source identifier that sufficiently distinguishes several APs (or other signal emitting devices) from each other may be used without departing from embodiments of the invention. For example, in some embodiments, an internet protocol (IP) address may be used in a configuration where the IP addresses are statically assigned to devices.

FIG. 3 depicts information at a location coordinate or node represented in a heatmap depicted in FIG. 2 using four entries. Embodiments of the invention are not limited to four entries and may have more or less entries. In some instances, the number of entries for the data structure may be based on the number of APs available, the capabilities of the APs and the implementation restrictions on the size of the data structure. Furthermore, in some embodiments, instead of, or in addition to, storing the source identifying information for several signal identifying entities and the measurements for their associated signals (e.g., RSSI/RTT), some or all of the data may be hashed to generate a unique fingerprint for the location, representing a snapshot view of the various signal characteristics observed at the location.

As described herein, for illustration purposes, embodiments of the invention are discussed referring to a wireless access point. However, any wireless signal emitting device 108 may be used without departing from embodiments of the invention. For example, in some embodiments, a wireless signal emitting device 108 may include devices such as light (visible and non-visible) emitting devices and sound (audible and non-audible) emitting devices. For example, a light emitting device may include a fluorescent light bulb. The fluorescent light bulb may emit information with sufficient uniqueness that can generally identify and differentiate the fluorescent light bulb from other fluorescent light bulbs in the environment. For example, the flicker of the light emitting from various light bulbs may be sufficiently distinct for each light bulb due to the manufacturing process to generally differentiate one fluorescent light bulb from another. In another embodiment, the fluorescent light bulb may be manufactured to emit a flicker with encoded information identifying the fluorescent light bulb. The flicker may not be noticeable to the human eye, but the mobile device 102 may be programmed to observe such a flicker. Furthermore, the proportionality of the measurement with respect to the distance between the light bulb and the mobile device can be measured using the amplitude of the light rays (i.e., brightness, illumination, etc.) received at the mobile device or any other suitable means.

In most instances, but not all, the signal emitting device may be stationary with respect to a location coordinate on the map thus providing information that is consistent over a period of time and may be used to generate a signature for the location.

In one implementation, the heatmap may not be limited to a particular type of signal emitting device or technique for measuring of the signal characteristics between the mobile device and the signal emitting devices. For example, for a heatmap for a GNSS-denied environment, the heatmap may include information associated with a combination of signal emitting devices 108 such as APs, radio beacons, cellular base stations, femtocells, fluorescent light bulbs, light (visible and non-visible) emitting devices and sound (audible and non-audible) emitting devices. Furthermore, even for APs, the signal characteristics may be measured using a combination of techniques such as RTT and RSSI. In some instances, the capabilities of the APs may determine the measurement technique used. For heatmaps that include a larger variance of signal emitting devices, such as APs, ultra-sound devices, light bulbs, the measuring techniques with respect to a the signal emitting devices may show an even greater variance, such as including RTT, RSSI, light flicker, etc.

The above figures (FIG. 2 and FIG. 3) describe a heatmap and the associated information stored at location coordinates for the heatmap. However, generating heatmaps for innumerable GNSS-denied locations and keeping those maps updated is a challenging task. For example, generating the heatmap may require that a technician manually visits each indoor location and creates a mapping between the wireless measurements at the location and the location itself. Furthermore, as the access points are removed, added or moved, the wireless measurements at each location may change, outdating the information associated with the heatmaps. Periodically updating the heatmap may require that the technician revisit the GNSS-denied location and recreate the association between the wireless measurements and locations.

As discussed in further detail below, at the mobile device, embodiments of the invention generally describe tagging visual data (e.g., image and/or video data) with wireless and sensor measurement information. In some implementations, additional metadata fields may be used for tagging visual data with wireless and/or sensor measurement information. The tagged information may be sent to a server, such as a crowdsourcing server 116, where the crowdsourcing server 116 may derive the location the image was captured at using visual features from the visual data and optionally sensor information included in the file. The crowdsourcing server 116 may extract the information associated with the wireless signal emitting device and associate the location coordinate on a heatmap with the information associated with the wireless signal emitting device.

Figure 4:
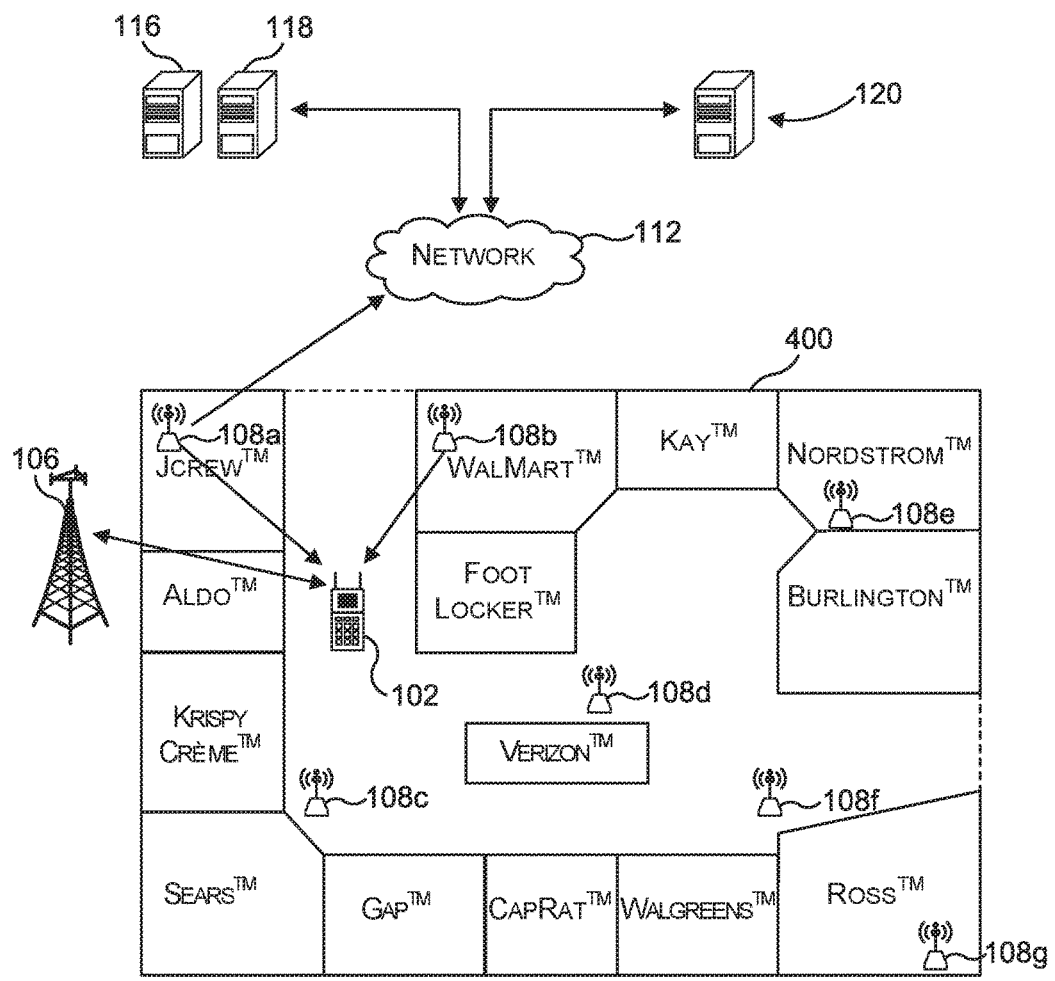
FIG. 4 illustrates an example mobile device configurable to capture visual data and information associated with wireless signal emitting devices and/or motion sensors.

Tagging Visual Data with Information:

FIG. 4 illustrates an example mobile device configurable to capture visual data, such as images and/or videos and tag the image with information associated with wireless signal emitting devices and/or motion sensors. As shown in FIG. 4, at a given point in time, the user of the mobile device 102 is at a shopping mall 400 with the mobile device 102. The shopping mall 400 may represent a GNSS-denied environment and may be similar to the operating environment 100 discussed in FIG. 1 in some respects. In FIG. 4, in one embodiment, the mobile device 102 may facilitate the crowdsourcing function by collecting data regarding the signal emitting devices 108 and transmitting that data to a crowdsourcing server 116 for generating, updating and maintaining a heatmap. In one implementation, the mobile device 102 may be pre-registered to collect data on behalf of the crowdsourcing server 116.

As shown in FIG. 4, the operating environment for the shopping mall 400 has several branded stores and depicts eight distinct signal emitting devices 108a-g, such as APs, spread throughout the shopping mall. The user of the mobile device 102 may take a picture or a video while inside the shopping mall, with the purpose of gathering information for a crowdsourcing server 116, or casually, as a normal course of action, for example, while visiting the shopping mall with friends and taking pictures together. The picture may inadvertently capture visual features from the scene, such as prominent store logos. Such visual features may be later used by the crowdsourcing server 116 for determining the location at which the visual data (image and/or video) was captured.

As shown in FIG. 4, approximately at the time of acquiring the visual data, the mobile device 102 receives signals from four different signal emitting devices 108a-d. The location of the signal emitting device with respect to the mobile device 102 may be unknown at the time of acquiring the visual data or receiving the signals from the signal emitting devices. The mobile device 102 determines source identifying information (e.g., MAC address) for each of the four signal emitting devices. Furthermore, in some implementations, the mobile device may also determine the RSSI and/or the RTT for the signal between the signal emitting device 108 and mobile device 102. The combination of the source identifying information and other characteristics of the signal, such as RSSI and/or RTT, may represent a relationship between the current location of the mobile device 102 and the signal emitting device. Several such relationships (e.g., MAC address, RSSI/RTT), similar to what has been described in FIG. 3, may form a sufficiently unique signature for the location of the mobile device 102.

Figure 5:
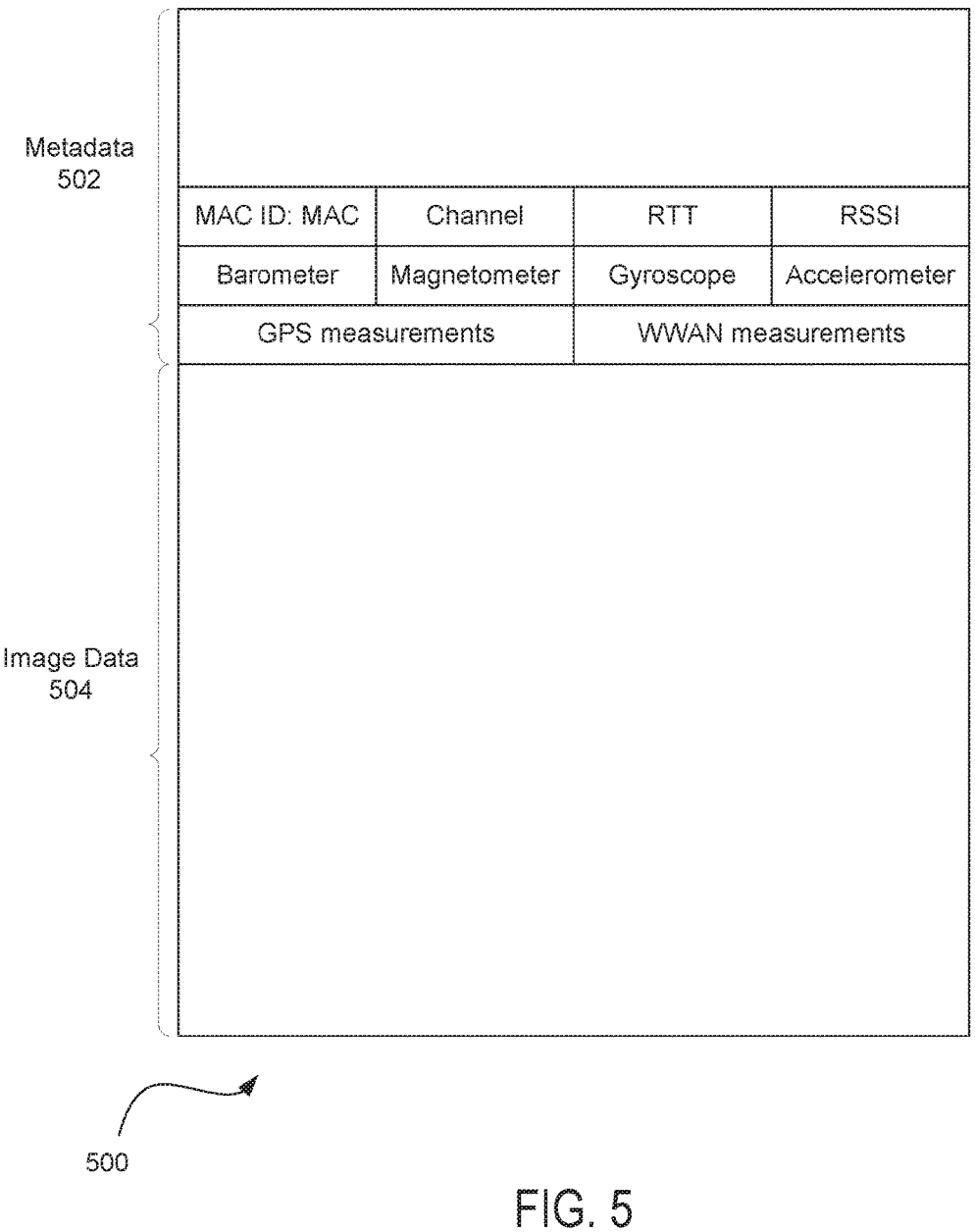
FIG. 5 illustrates an example data structure for an image file according to certain aspects of the disclosure.

In one embodiment, the mobile device 102 may tag the information associated with the one or more APs acquired at the time the image or video was taken by a camera coupled to the mobile device 102 to the captured visual data associated with the image or video. Tagging of the visual data with information associated with the one or more APs at the time the visual data is captured forms a strong temporal and spatial association between the visual information embodied in the visual data and the signals received by the mobile device 102 at the instance the visual data is captured. FIG. 5 below describes one example embodiment of tagging visual data with information associated with the wireless signals.

In addition to tagging visual data with information associated with wireless signal emitting devices 108, the mobile device 102 may also tag the visual data with sensor data, such as information from one or more barometer sensors, magnetometer sensors or motion sensors. Tagging the visual data with information from barometer sensors may help indicate the elevation at which the image was captured. Similarly, tagging the visual data with information from the magnetometer may help determine the heading of the mobile device 102 at the time the visual data was captured. Furthermore, the mobile device may include motion sensors, such as inertial sensors that may include gyroscopes and accelerometers. Tagging the visual data with motion sensors may also help determine the pose of the device and any relative and absolute motion experienced by the mobile device 102 at the time the visual data is acquired.

In some instances, tagging the visual data with sensor information may comprise tagging the visual data with a delta or change associated with the readings of the sensor data. For example, in some instances it may be useful to include the change in the barometric pressure rather than the absolute barometric pressure to determine that the user has moved from one level of the shopping mall to another level of the shopping mall. Similarly, for a gyroscope, the change in the gyroscope sensor reading may be more helpful in determining the relative rotation from a previously determined pose, rather than the absolute value of the gyroscope reading at the time the image was captured.

FIG. 5 illustrates an example data structure for an image/video file that depicts tagging visual data acquired using a camera with information associated with signal emitting devices and/or sensors. Information associated with the signal emitting devices may include source identifying information for the signal emitting devices and wireless and/or sensor measurement information. Tagging the visual data with information associated with the signal emitting devices may refer to including the additional information in the metadata for the image/video file. Generally, metadata describes the attributes associated with the image/video. For example, the metadata for an Exchangeable image file format (Exif) may include the format of the file, the device used to capture the image, date and time, resolution of the image, exposure, focal length, flash, etc.

Embodiments also describe expanding the current format dictated by the standards for image (e.g., Exif) and video formats (mediaObject metadata) to include information associated with wireless signal emitting devices and sensor data in the metadata. Examples of wireless information may include, but is not limited to wireless wide area network (WWAN) measurements and Wi-Fi measurements. Wi-Fi measurements may include RSSI and RTT measurements. Sensor information may include barometer, magnetometer and motion sensor (e.g., accelerometer, gyroscope, etc.) information. The mobile device 102 may generate a file according to the new expanded standard for Exif images and store it in memory Immediately, or at a later point in time, the mobile device 102 may transmit the file with the tagged visual data to the crowdsourcing server 116.

FIG. 5 illustrates an example image file 500 showing the image data 504 and the associated metadata 502 with the image data. In FIG. 5, the metadata 502 depicts additional information associated with signal emitting devices and sensors coupled to the mobile device 102, according to certain embodiments of the invention.

In one embodiment, the signal emitting devices may be one or more APs (although, fields for only one AP are shown). The source identifying information associated with the AP may be the MAC address. The information associated with the signal received from the signal emitting device, such as the AP, may be the RTT and/or the RSSI measurements. In some embodiments, the type of measurement may be selected based on the capabilities of the AP. For instance, some APs may not support RTT capability and RSSI measurements may be used instead. In some instances, both RTT and RSSI measurements may be used to provide additional information in defining the signal characteristics at the location of the mobile device 102. In some implementations, the channel or the frequency in use by the AP may also be included in the metadata 502 for the image file 500.

In one example, where the user is taking a picture using a camera coupled to the mobile device 102, the image data may be stored as an image file using an expanded Exif standard, as described herein. In one example, an Extensible Metadata Platform (XMP) that is part of the international organization of standards (ISO) may be used in defining and populating the fields for the metadata, such as MAC ID (e.g, 1caa07c6e370), RSSI (e.g., −70 dbm) and/or RTT (e.g., 0.0154 msecond). In another example (not shown), similar fields may be used for tagging a video file (e.g., mediaObject metadata).

Figure 6:
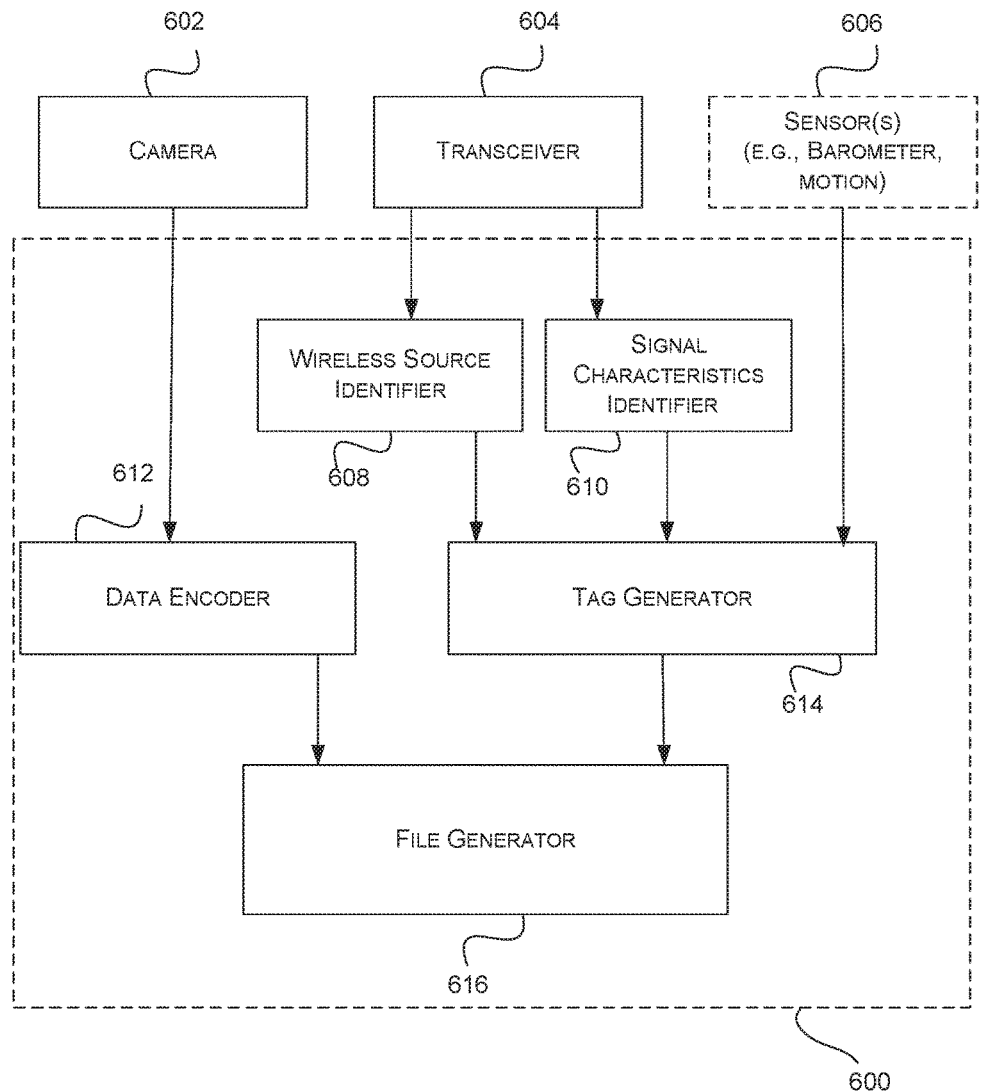
FIG. 6 illustrates a block diagram for example modules implemented in a mobile device according to certain aspects of the disclosure.

FIG. 6 illustrates a block diagram for example modules implemented in a mobile device 102 according to one embodiment of the invention. The mobile device 102 may be a computer device implemented using one or more components described in FIG. 12. Modules described in FIG. 6 may be implemented using software, firmware, hardware or any other combination thereof. In one embodiment, some of the modules described in FIG. 6 may be stored as software modules on a computer-readable medium 600 that may be any magnetic, electronic, optical, or other computer-readable storage medium. In one implementation, the computer-readable storage medium may include a wireless source identifier 608, signal characteristics identifier module 610, data encoder module 612, tag generator module 614, and file generator module 616.

The user may acquire visual data (i.e., take pictures or capture a video) using one or more cameras module 602 coupled to the mobile device 102 in a GNSS-denied environment. In one example, as shown in FIG. 4, the user may be shopping in a shopping mall 400 while also using their mobile device 102 to take pictures or capture a video.

The data encoder module 612 may encode the visual data into a standard format, such as Tagged Image File Format (TIFF) or Joint Photographic Experts Group (JPEG) for images or Movie Pictures Expert Group-4 (MPEG4) for video or any other suitable format.

Approximately, at the time the user acquires visual data, the wireless transceiver 604 coupled to the mobile device 102 may receive one or more wireless signals from one or more signal emitting devices. Although only one transciever module 604 is illustrated in FIG. 6, it is understood that a mobile device may include one or more wireless transceivers that may be capable of transmitting as well as receiving wireless signals. In some instantiations, the transceiver module 604 may include components configurable to emit and receive signals, such as Wi-Fi signal, audible and non-audible (e.g., ultra-sound) sound, and visible and non-visible (e.g., infrared) light rays.

Wireless signal emitting devices may represent different types of devices, such as Access Points, radio beacons, cellular base stations, femtocells, or the like, depending on an implementation. For example, in some embodiments, a wireless signal emitting device 108 may include devices such as light (visible and non-visible) emitting devices and sound (audible and non-audible) emitting devices.

The wireless source identifier module 608 may receive information from the transceiver 604 and derive source identifying information associated with the signal emitting device from the wireless signal. For example, the wireless source identifier 608 module may decode the header for a data packet received from a wireless access point and derive the MAC address. The MAC address provides a sufficiently unique identifier for the access point.

The signal characteristics identifier module 610 may derive characteristics associated with the signal from the signal emitting device that may indicate the relative positioning of the mobile device 102 with respect to the signal emitting device. For example, the signal characteristics identifier module 610 may derive the signal strength (i.e., RSSI) of the at least one wireless signal received from the at least one signal emitting device measured at the device. In another example, the signal characteristics identifier module 610 may derive the round-trip time (i.e., RTT) using the at least one wireless signal from the at least one signal emitting device.

The tag generator module 614 may generate a tag using the source identifying information from the wireless source identifier module 608 for each of the signal emitting devices and the associated RSSI, RTT or any other signal characteristic identifier from the signal characteristics identifier module 610. Generating the tag may comprise formatting the information regarding the signal emitting device such that it can be included in the metadata for a file.

In one embodiment, the tag generator module 614 may optionally receive information from one or more sensors from the sensors 606 module and use it in generating the tag. Sensor information may include barometer, magnetometer and motion sensor (e.g., accelerometer, gyroscope, etc.) information. In some implementations, the sensor information incorporated in the tag may also include GNSS coordinates, if available, or last known GNSS derived location that may help derive a coarse estimation of the location for further processing.

The file generator module 616 may receive input from the data encoder module 612 and the tag generator module 614 and generate the file. In one embodiment, for image data, the file may be generated according to the Exif standard by including the encoded data from the data encoder module 612 (e.g., JPEG or TIFF) and the tag from the tag generator module 614.

After generating the file, in one embodiment, the mobile device 102 may also transmit the file to a remote server, such as a crowdsourcing server 116.

Figure 7:
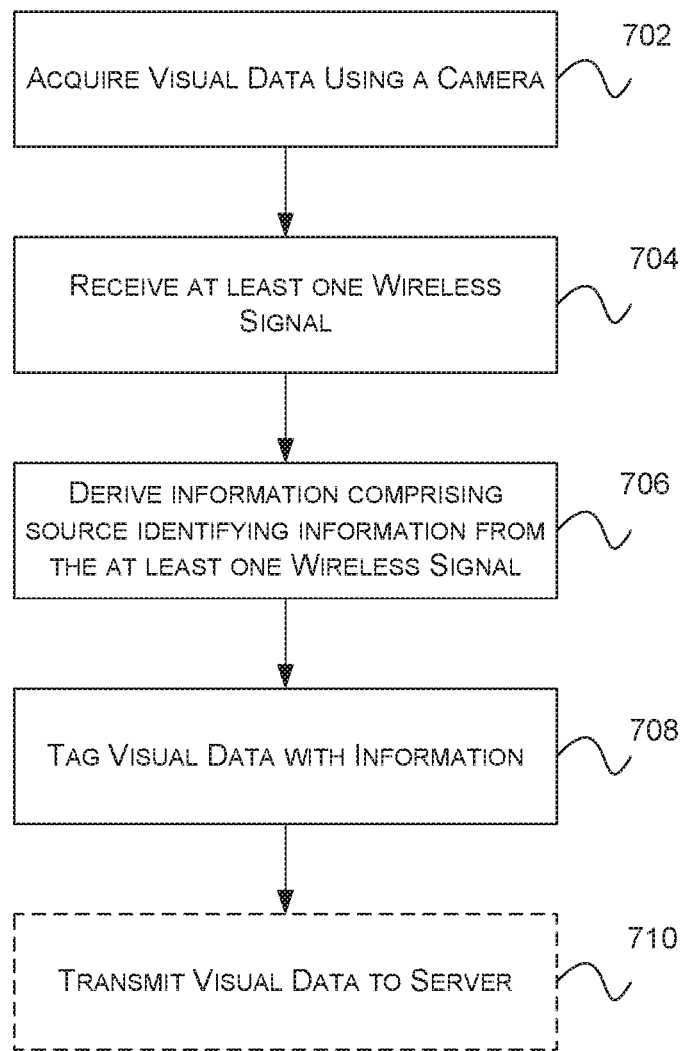
FIG. 7 is a flow diagram illustrating a method for performing one or more illustrative aspects of the disclosure.

FIG. 7 is a flow diagram illustrating a method for performing embodiments of the invention according to one or more illustrative aspects of the disclosure. According to one or more aspects, any and/or all of the methods and/or method blocks described herein may be implemented by and/or in a mobile device 102, such as the mobile device 102 shown in FIG. 1 and/or the device described in greater detail in FIG. 12, for instance. In one embodiment, one or more of the method blocks described below with respect to FIG. 7 are implemented by a processor of the computing device 1200, such as the processor 1210 or another processor. Additionally, or alternatively, any and/or all of the methods and/or method blocks described herein may be implemented in computer-readable instructions, such as computer-readable instructions stored on a computer-readable medium such as the memory 1235, storage device(s) 1225 or another computer-readable medium.

At block 702, components of the mobile device 102, such as the camera coupled to the mobile device 102 may acquire visual data from a scene. The visual data may include one or more images and/or video clips. In one embodiment, the visual data may be acquired in a GNSS-denied environment. For example, the user may be taking pictures in an indoor location, such as a shopping mall without direct line of sight to a sufficient number of GNSS satellites.

At block 704, components of the mobile device 102, such as the transceiver 604 (see FIG. 6), may receive one or more wireless signals from one or more signal emitting devices.

At block 706, components of the mobile device 102, such as the wireless source identifier 608 (see FIG. 6) using one or more processors, may derive information comprising source identifying information associated with the one or more signal emitting devices from the received wireless signals. For example, in the instances where the signal emitting devices are wireless access points, components of the mobile device 102 may determine the source of the wireless signal by deriving the MAC address from the header of the data packets transmitted over the wireless signal.

Optionally, components of the mobile device 102, such as the signal characteristics identifier module 610 (see FIG. 6) may also derive characteristics associated with the signal from the signal emitting device that may indicate the relative positioning of the mobile device 102 with respect to the signal emitting device. For example, the signal characteristics identifier module 610 may derive the RSSI or RTT for the signal originating from an AP.

At block 708, components of the mobile device 102 tag visual data with information associated with the one or more signal emitting devices and generate a file. Optionally, components of the mobile device 102, may also tag the visual data with information from one or more sensors from the sensors 606. Sensor information may include barometer, magnetometer and motion sensor (e.g., accelerometer, gyroscope, etc.) information. In one embodiment, the file may be formatted according to an industry standard, such as Exif and tagging the visual data may refer to including the information as part of metadata for the image file. In some implementations, the sensor information incorporated in the tag may also include GNSS coordinates, if available, or last known GNSS derived location that may help derive a coarse estimation of the location, by the receiver of the image file.

At block 710, components of the mobile device 102, such as the transceiver 604, may transmit the file to a remote server.

It should be appreciated that the specific blocks illustrated in FIG. 7 provide a particular method of switching between modes of operation, according to an embodiment of the present invention. Other sequences of blocks may also be performed accordingly in alternative embodiments. For example, alternative embodiments of the present invention may perform the blocks outlined above in a different order. Furthermore, additional blocks or variations to the blocks may be added or removed depending on the particular applications. One of ordinary skill in the art would recognize and appreciate many variations, modifications, and alternatives of the process.

Generating the Heatmap

Figure 8:
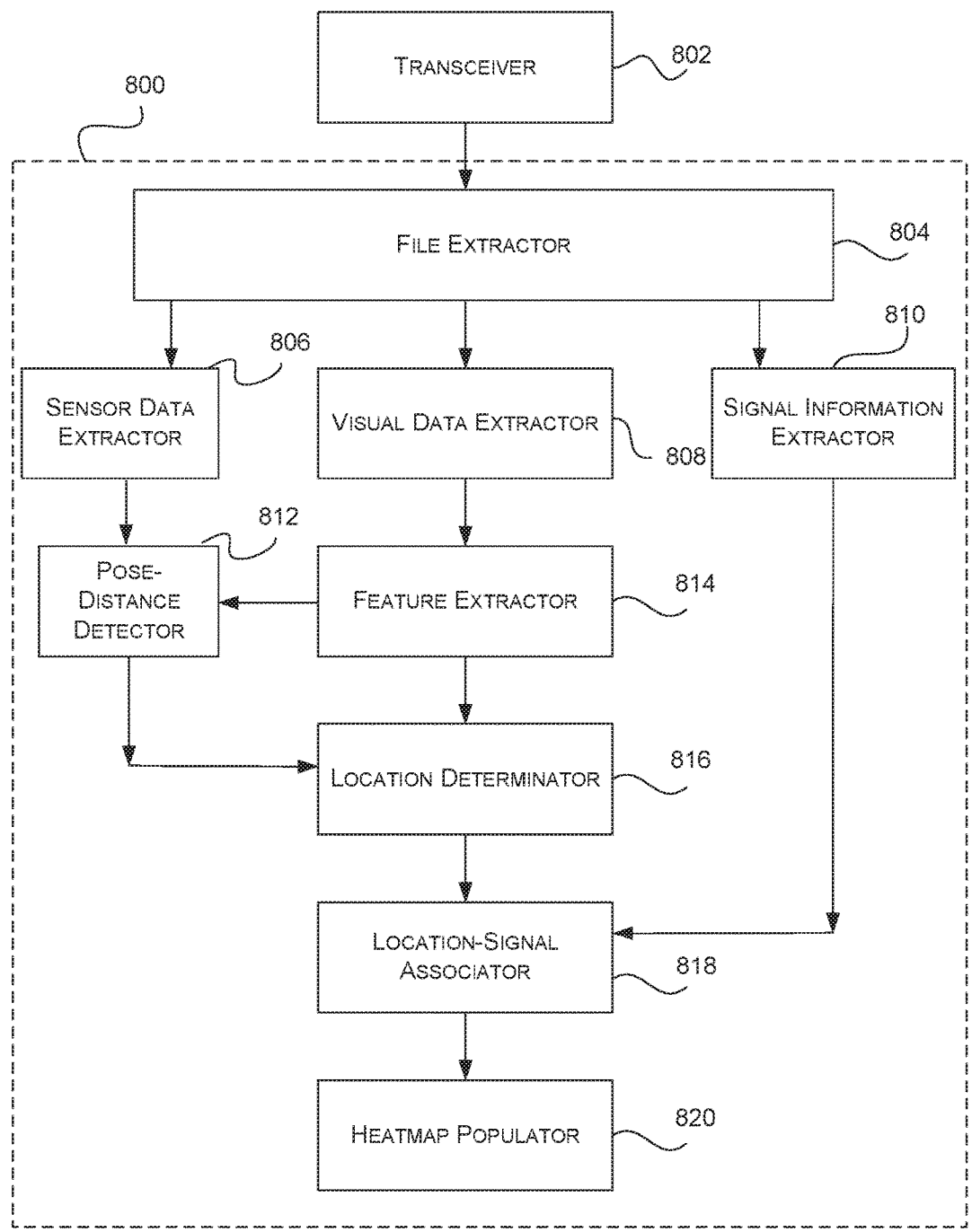
FIG. 8 illustrates a block diagram for example modules implemented in a crowdsourcing server according to certain aspects of the disclosure.

FIG. 8 illustrates a block diagram for example modules implemented in a crowdsourcing server 116 according to one embodiment of the invention. The crowdsourcing server 116 may be a computer device implemented using one or more components described in FIG. 12. Modules described in FIG. 8 may be implemented using software, firmware, hardware or any other combination thereof. In one embodiment, some of the modules described in FIG. 8 may be stored as software modules on a computer-readable medium 800 that may be any magnetic, electronic, optical, or other computer-readable storage medium. In one implementation, the computer-readable storage medium 800 may include a file extractor 804, visual data extractor 808, signal information extractor 810, feature extractor 814, pose-distance detector 812, location determinator 816, location-signal associator 818, heatmap updater 820, and sensor data extractor 806

The transceiver 802, coupled to the crowdsourcing server 116 may receive information from one or more mobile devices, similar to the mobile device 102, discussed with reference to previous figures. In some instantiations, the transceiver 802 may include components configurable to transmit and receive signal through wireless or wired transmission.

The file extractor 804 may receive data from the transceiver 802 in the form of data packets. In one embodiment, the file extractor 804 may extract files from the data by reading the file header for file type and size or/and combining data from one or more data packets to recreate the file.

Once the file is extracted from the transmission medium and stored in memory, the visual data extractor 808 extracts the image/video information, the sensor data extractor 806 extracts the sensor information, and the signal information extractor 810 extracts signal information, such as the signal source identifier, RSSI, and/or RTT. In one embodiment, the visual data extractor 808 may not only extract the visual data, but also decode the visual data from one format to another, using known techniques, before presenting the data to the feature extractor 814 module.

The feature extractor 814 module receives the visual data from the visual data extractor 808. The feature extractor 814 module extracts key points and/or other image features associated with the image to estimate a position of a mobile device, such as via logo detection, for example, in a GNSS-denied environment. As used herein, "visual feature," "logo," "visual signature," "brand-specific visual signature," or "textual label" may be used interchangeably and may refer to one or more visual elements capable of being identified or recognized based, at least in part, on their relatively uniform representation or consistency of use, in commerce or otherwise. In some instances, a logo may be associated with a good or service being provided at one or more points of interest (POIs), such as stores, coffee shops, retailer outlets, banks, or the like so as to distinguish such a good or service from other goods or services, for example, or indicate a source of such a good or service. At times, a logo may be associated with a suitable infrastructure, such as an urban planning or transportation related infrastructure, for example, provided at one or more points of interest, such as a street corner, intersection, building, or the like. A logo may also be representative of a characteristic of a suitable infrastructure, such as, for example, a particular portion of a building exterior (e.g., facade, side, back, etc.), just to illustrate another possible implementation. In other words, in the context of the present specification, "logo" is to be interpreted broadly and may comprise any visual element that may be identified, such as electronically via one or more computer vision or like approaches, for example, that may facilitate location detection in a GNSS-denied environment.

Figure 9:
FIG. 9 illustrates an example of a store logo acquired by a mobile device according to certain aspects of the disclosure.

As a way of illustration, a visual feature may comprise, for example, a logo, trademark, trade name, trade dress of a building (e.g., facade, storefront, etc.), signage (e.g., traffic sign, street designation, regulatory pictograph, etc.), logotype or wordmark, symbol, icon, emblem, badge, or the like. In some instances, a logo may, for example, be identified or recognized based, at least in part, on its uniformity or consistency of use with respect to its shape, color, size, text, text size, placement or arrangement of visual elements, or the like. At times, a logo may comprise, for example, a dynamic logo, meaning that content or context of such a logo may change depending on a particular setting, time of day, season, location, lighting conditions, good, service, or the like. By way of example but not limitation, in some instances, brand-specific visual signatures, such as Gap®, GapOutlet®, GapKids®, babyGap®, GapMaternity®, or the like may be representative of a dynamic logo. It should be appreciated that variations of a dynamic logo may or may not be considered different logos, which may depend, at least in part, on an application, environment, visual feature extraction techniques, logo detection approaches, or the like. Of course, these are merely examples relating to a logo, and claimed subject matter is not so limited. FIG. 9 illustrates an example of a store logo for Gap® acquired by a mobile device 102 from a certain vantage point from the shopping mall.

The feature extractor 814 leverages one or more sources of information to detect places of interests (POIs) or other objects from the visual data. In one implementation, the file may be additionally tagged with the last known location of the mobile device 102 acquiring the image. For example, the mobile device 102 may tag the visual data with location derived using GNSS information before the user enters the GNSS-denied environment. The last known location may enable the crowdsourcing server 116 to retrieve a map for the shopping mall based on the course estimate of the general location of the user, using the last known location. For example, using the last known location of the mobile device 102, the crowdsourcing server 116 may more readily match a detected feature, such as a logo (e.g., Gap®) determined by the feature extractor 814 with a store from the shopping mall, using an already stored map of the shopping mall at the crowdsourcing server 116. An example map for a shopping mall, stored at the crowdsourcing server 116, may be illustrated by FIG. 10. Map information may comprise, for example, a digital map (e.g., floor plans, etc.) of a venue associated with a mobile device identifying one or more structural features, such as walls, rooms, doors, passageways, elevators, staircases, ladders, floors, ceilings, etc., of the venue.

Figure 10:
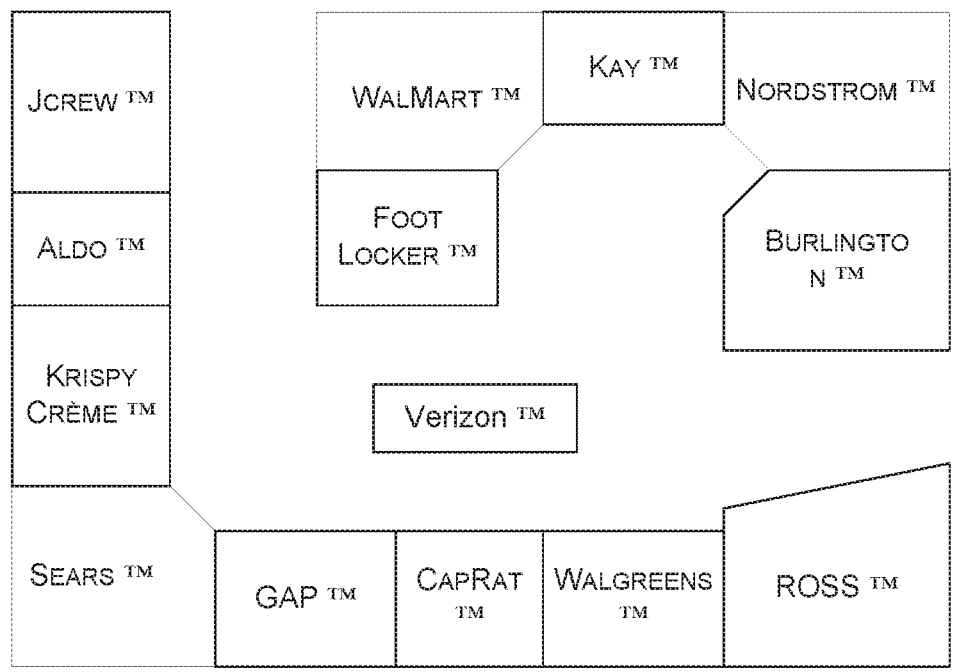
FIG. 10 illustrates an example map for a shopping mall stored at the crowdsourcing server.

In the case of a visual recognition technique, such as that employed for vision-based positioning in a shopping mall, the feature extractor 814 may compare a test image (e.g., a storefront image) against a set of known reference images stored for the map shown in FIG. 10 to detect a POI. The reference image may be a standalone image, or alternatively the reference image may relate more generally to a set of known brand-specific visual signatures corresponding to logos, standard storefronts, etc., specific to the map for the shopping mall, as shown in FIG. 10. Detection is generally performed using computer vision techniques, such as scale-invariant feature transform (SIFT) algorithms or the like.

The pose-distance detector 812 module may be configured to estimate the pose of the mobile device 102 and the distance of the mobile device 102 with respect to the visual feature using 1) visual features from the image itself and/or 2) sensor information from the sensor data extractor 806 module. For example, the shape and size of a store logo may indicate the direction from which the mobile device 102 captured an image of the logo and the distance between the logo and the mobile device 102 at the time of image acquisition. Sensor information from the sensor data extractor module 806 may also help with the pose and distance determination. For example, the magnetometer data may help determine the heading of the mobile device 102 at the time of the visual data acquisition. The barometer data may help determine the floor the image was taken from for a multi-leveled shopping mall. Also motion sensors (such as accelerometers and/or gyroscopes) may help determine or augment the determination of the orientation of the mobile device 102 at the time of image acquisition.

The location determinator 816 may use the information from the feature extractor 814 module and the pose-distance detector 812 module in determining the location of the mobile device 102 at the time of the visual data acquisition using the camera. The feature extractor 814 module may identify the visual feature using a digital map for the shopping mall. Once a visual feature is extracted and identified, the actual size of the visual feature may be known by referencing the stored data associated with the map of the shopping mall. For example, the crowdsourcing server 116 may already know the actual size and location of the GAP® storefront log. Using this information, the pose-distance detector 812 module can determine the distance of the mobile device 102 with respect to the visual feature, since the size of the visual feature acquired is directly proportional to the distance between the visual feature and the mobile device 102. The pose-distance detector 812 module may also determine the pose of the mobile device 102 with respect to the visual feature using the shape of the visual feature. For example, in FIG. 10, it can be derived that the image was acquired from the left-front side of the GAP® logo (which is actually rectangular in shape) since the GAP® logo is visible in a trapezoid shape in the visual data with the left edge of the logo being the longest. The location determinator 816 module determines the location of the mobile device 102 at the time of visual data acquisition on the map using the location of a visual feature, such as a store logo and the pose and distance of the mobile device 102 with respect to the store logo.

The location-signal associator 818 module receives the location coordinates at which the visual data was acquired by the mobile device 102 from the location determinator 816 and the signal information from the signal information extractor 810 module. In one embodiment, the signal information extractor 810 extracts the source identifying information associated with the signal emitting module and the characteristics of the signal, such as the RSSI and/or the RTT information from the file (metadata) extracted by the file extractor 804 module and provide the signal information to the location-signal associator 818. The location-signal associator 818 builds an association between the location coordinate and the signal characteristics.

The heatmap updater 820 module may take the association between the location coordinate and the signal information from the location-signal associator 818 module and update the heatmap associated with the map of the shopping mall. The heatmap illustrated in FIG. 2 depicts an example of such a heatmap that is updated and later provided to other mobile devices for determining their location in a GNSS-denied environment.

The system described in FIG. 8 illustrates the process of receiving the visual data tagged with wireless and/or sensor information and the updating of the heatmap associated with the location map at which the visual data was acquired from one mobile device 102. Similarly, the crowdsourcing server 116 may receive tagged visual data from several mobile devices and collect data from several locations overtime. With information from several mobile devices, the accuracy of the heatmap stored at the crowdsourcing server continually improves and is maintained overtime.

Figure 11:
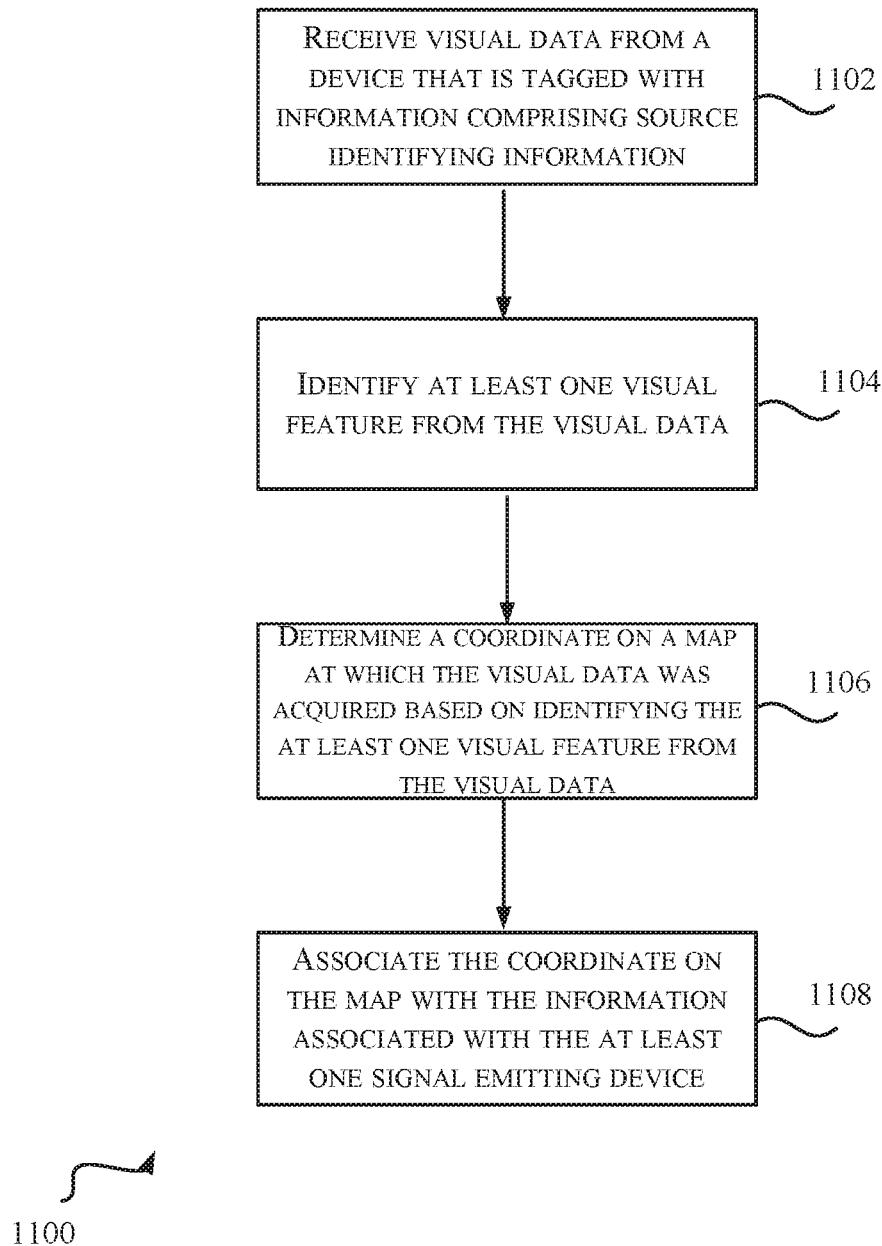
FIG. 11 is a flow diagram illustrating a method for performing embodiments of the invention according to one or more illustrative aspects of the disclosure.

FIG. 11 is a flow diagram illustrating a method for performing embodiments of the invention according to one or more illustrative aspects of the disclosure. According to one or more aspects, any and/or all of the methods and/or method blocks described herein may be implemented by and/or in a computer server, such as the crowdsourcing server 116, described in greater detail in FIG. 12, for instance. In one embodiment, one or more of the method blocks described below with respect to FIG. 11 are implemented by a processor of the computing device 1200, such as the processor 1210 or another processor. Additionally, or alternatively, any and/or all of the methods and/or method blocks described herein may be implemented in computer-readable instructions, such as computer-readable instructions stored on a computer-readable medium, such as the memory 1235, storage device(s) 1225 or another computer-readable medium.

At block 1102, components of the mobile device 102, such as the transceiver 802, receives visual data from a device, such as the mobile device 102, wherein the visual data is tagged with information comprising source identifying information associated with an at least one signal emitting device. The visual data may include image data or video data. For image data, the visual data may be included in an image file formatted according to Exchangeable image file format (Exif) and tagging of the visual data may comprise including the information associated with the at least one signal emitting device as part of metadata for the image file.

In one implementation, the signal emitting device is a wireless access point and the source identifying information may be the MAC address of the wireless access point. The location of the signal emitting device may be unknown at least at a time the visual data is acquired using a camera.

In one embodiment, the information associated with the at least one signal emitting device may include signal strength (i.e., RSSI) of an at least one wireless signal from the at least one signal emitting device measured at the device. In another embodiment, the information associated with the at least one signal emitting device may include a round-trip time (i.e., RTT) derived using at least one wireless signal from the at least one signal emitting device.

Furthermore, the visual data may be tagged with barometer information, magnetometer information, and/or motion sensor information. Motion sensors may include accelerometers and gyroscopes. Such sensor information associated with the device may enable determination of the location of the mobile device 102 at which the visual data was acquired using a camera coupled to the device. For example, the barometer information may provide the level or height at which the visual data was acquired by the mobile device 102. Similarly, the magnetometer information may provide the heading of the camera at the time the visual data was acquired. Motion sensors may provide additional orientation information that may also help determine the pose of the mobile device 102 at the time the visual data was acquired.

At block 1104, components of the mobile device 102, such as the feature extractor 814 identifies at least one visual feature from the visual data, as discussed in detail with reference to FIG. 8.

At block 1106, components of the mobile device 102, such as the location determinator 816, may determine a coordinate on a map at which the visual data was acquired based on identifying the at least one visual feature from the visual data.

At block 1108, components of the mobile device 102, such as the location-signal associator 818, may associate the coordinate on the map with the information associated with the at least one signal emitting device. The map may be for a GNSS-denied environment.

It should be appreciated that the specific blocks illustrated in FIG. 11 provide a particular method of switching between modes of operation, according to an embodiment of the present invention. Other sequences of blocks may also be performed accordingly in alternative embodiments. For example, alternative embodiments of the present invention may perform the blocks outlined above in a different order. Furthermore, additional blocks or variations to the blocks may be added or removed depending on the particular applications. One of ordinary skill in the art would recognize and appreciate many variations, modifications, and alternatives of the process.

Figure 12:
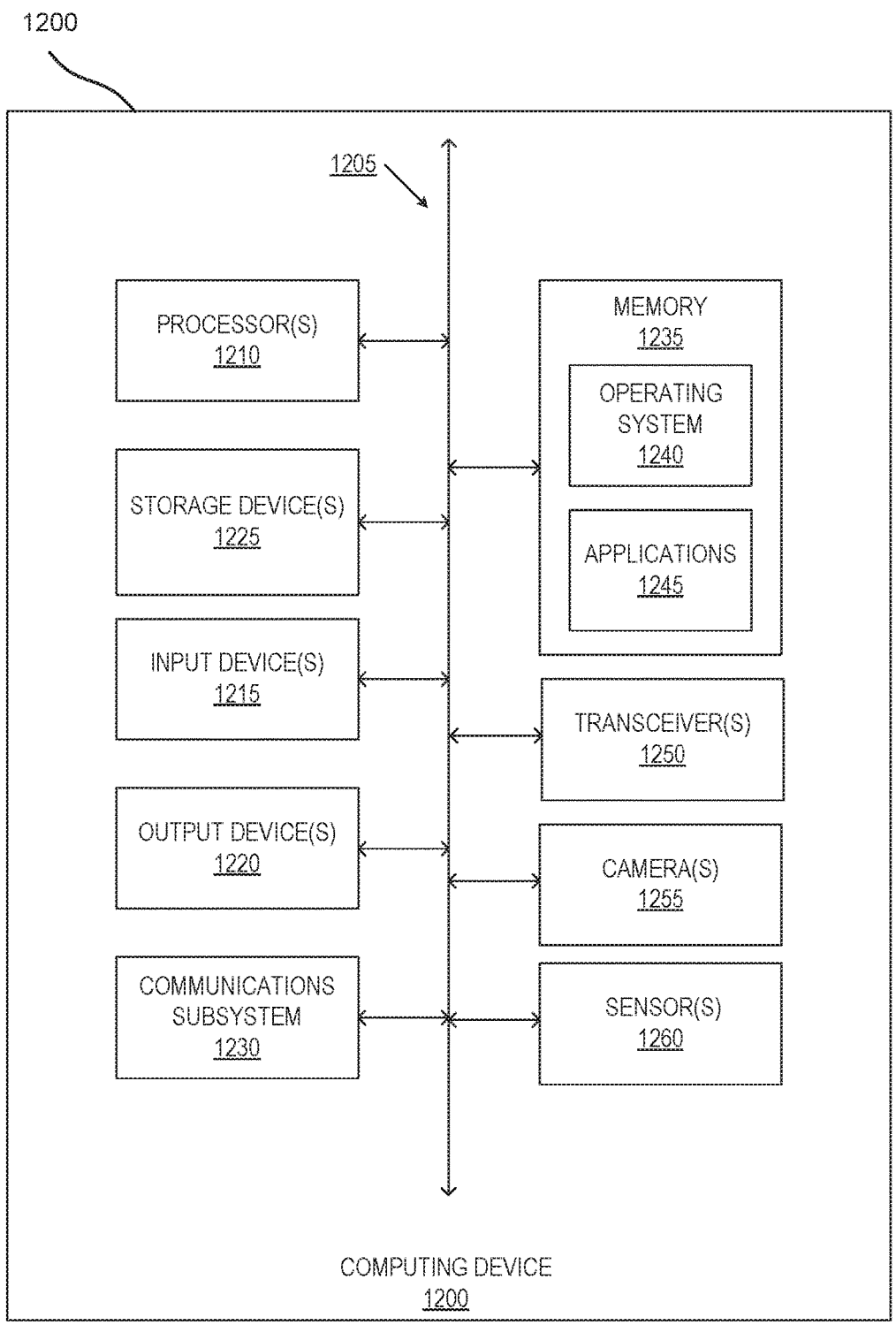
FIG. 12 illustrates an example of a computing system in which one or more embodiments may be implemented.

FIG. 12 illustrates an example computing device incorporating parts of the device employed in practicing embodiments of the invention. A computing device as illustrated in FIG. 12 may be incorporated as part of any computerized system, herein. For example, computing device 1200 may represent some of the components of a mobile device or a server (e.g., crowdsourcing server). Examples of a computing device 1200 include, but are not limited to, desktops, workstations, personal computers, supercomputers, video game consoles, tablets, smart phones, laptops, netbooks, or other portable devices. FIG. 12 provides a schematic illustration of one embodiment of a computing device 1200 that may perform the methods provided by various other embodiments, as described herein, and/or may function as the host computing device, a remote kiosk/terminal, a point-of-sale device, a mobile multifunction device, a set-top box and/or a computing device. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computing device 1200 is shown comprising hardware elements that may be electrically coupled via a bus 1205 (or may otherwise be in communication, as appropriate). The hardware elements may include one or more processors 1210, including, without limitation, one or more general-purpose processors and/or one or more special-purpose processors (such as digital signal processing chips, graphics acceleration processors, and/or the like); one or more input devices 1215, which may include, without limitation, one or more cameras 1255, sensors 1260, a mouse, a keyboard and/or the like; and one or more output devices 1220, which may include, without limitation, a display unit, a printer and/or the like. Sensors 1260 module may include barometer, magnetometer and/or motion sensors, such as gyroscopes and accelerometers.

The computing device 1200 may further include (and/or be in communication with) one or more non-transitory storage devices 1225, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

The computing device 1200 might also include a communications subsystem 1230. The communications subsystem 1230 may include a transceiver 1250 for receiving and transmitting data or a wired and/or wireless medium. The communications subsystem 1230 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computing devices, and/or any other devices described herein. In many embodiments, the computing device 1200 will further comprise a non-transitory working memory 1235, which may include a random access (RAM) or read-only (ROM) device, as described above.

The computing device 1200 may comprise software elements, shown as being currently located within the working memory 1235, including an operating system 1240, device drivers, executable libraries, and/or other code, such as one or more application program(s) 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computing device, such as computing device 1200. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1200 and/or might take the form of source and/or installable code, which, upon compilation and/or installation on the computing device 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices, similar to computing device 1200, such as network input/output devices may be employed.

Some embodiments may employ a computing device (such as the computing device 1200) to perform methods in accordance with the disclosure. For example, some or all of the procedures of the described methods may be performed by the computing device 1200 in response to processor 1210 executing one or more sequences of one or more instructions (which might be incorporated into the operating system 1240 and/or other code, such as application program(s) 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "non-transitory computer-readable medium," "machine-readable medium" and "computer-readable medium," as used herein, refer to any medium that participates in providing data that causes a machine to operate in a specific fashion. In an embodiment implemented using the computing device 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205, as well as the various components of the communications subsystem 1230 (and/or the media by which the communications subsystem 1230 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1200. These signals, which might be in the form of electromagnetic signals, acoustic signals, optical signals and/or the like, are all examples of carrier waves on which instructions may be encoded, in accordance with various embodiments of the invention.

The communications subsystem 1230 (and/or components thereof) generally will receive the signals, and the bus 1205 then might carry the signals (and/or the data, instructions, etc., carried by the signals) to the working memory 1235, from which the processor(s) 1210 retrieves and executes the instructions. The instructions received by the working memory 1235 may optionally be stored on non-transitory storage device(s) 1225 either before or after execution by the processor(s) 1210.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional blocks not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of blocks may be undertaken before, during, or after the above elements are considered. Accordingly, the above description does not limit the scope of the disclosure.

What is claimed is:

1. A method for generating map data, the method comprising:
   receiving visual data captured by a camera coupled to a device, wherein the visual data is tagged with source identifying information associated with a wireless access point other than the device by including the source identifying information in metadata attached to the visual data, wherein the metadata describes attributes associated with the visual data;
   acquiring the source identifying information associated with the wireless access point from the metadata attached to the visual data;
   identifying at least one visual feature from the visual data;
   determining a coordinate on a map at which the visual data was acquired based on identifying the at least one visual feature from the visual data; and
   associating the coordinate on the map with the source identifying information associated with the wireless access point acquired from the metadata attached to the visual data.

2. The method of claim 1, wherein the visual data is further tagged with signal strength of an at least one wireless signal from the wireless access point measured at the device, and further comprising
   acquiring the signal strength of the at least one wireless signal from the wireless access point from the metadata attached to the visual data; and
   associating the coordinate on the map with the signal strength of the at least one wireless signal.

3. The method of claim 1, wherein the visual data is further tagged with a round-trip time derived using at least one wireless signal from the wireless access point, and further comprising
   acquiring the round-trip time derived using the at least one wireless signal from the wireless access point from the meta data attached to the visual data; and
   associating the coordinate on the map with the round-trip time derived using the at least one wireless signal.

4. The method of claim 1, wherein the visual data is further tagged with barometer information associated with the device and wherein determining the coordinate on the map at which the visual data was captured by the camera coupled to the device comprises using the barometer information associated with the device.

5. The method of claim 1, wherein the visual data is further tagged with magnetometer information associated with the device and wherein determining the coordinate on the map at which the visual data was captured by the camera coupled to the device comprises using the magnetometer information associated with the device.

6. The method of claim 1, wherein the visual data is further tagged with motion data associated with motion of the device and wherein determining the coordinate on the map at which the visual data was captured by the camera coupled to the device comprises using the motion data associated with the device.

7. The method of claim 1, wherein the source identifying information associated with the wireless access point is a media access control (MAC) address.

8. The method of claim 1, wherein the map is for a GNSS-denied environment.

9. The method of claim 1, wherein a location of the wireless access point is unknown at least at a time the visual data is captured by the camera.

10. The method of claim 1, wherein the visual data is included in an image file formatted according to Exchangeable Image File Format (Exif).

11. The method of claim 1, wherein the visual data is a video.

12. A server computing device comprising:
   a transceiver configured to receive visual data captured by a camera coupled to a device, wherein the visual data is tagged with source identifying information associated with a wireless access point other than the device by including the source identifying information in metadata attached to the visual data, wherein the metadata describes attributes associated with the visual data;
   a memory configured to store the visual data and the metadata;
   one or more processors configured to:
      acquire the source identifying information associated with the wireless access point from the metadata attached to the visual data;
      identify at least one visual feature from the visual data;
      determine a coordinate on a map at which the visual data was acquired based on identifying the at least one visual feature from the visual data; and
      associate the coordinate on the map with the source identifying information associated with the wireless access point acquired from the metadata attached to the visual data.

13. The server computing device of claim 12, wherein the visual data is further tagged with one or more of signal strength of at least one wireless signal from the wireless access point measured at the device or a round-trip time derived using the at least one wireless signal from the wireless access point, and further comprising the server computing device configured to:
   acquire, from the metadata attached to the visual data, the one or more of signal strength of the at least one wireless signal from the wireless access point or the round-trip time derived using the at least one wireless signal from the wireless access point; and
   associate the coordinate on the map with the one or more of the signal strength of the at least one wireless signal from the wireless access point or the round-trip time derived using the at least one wireless signal from the wireless access point.

14. The server computing device of claim 12, wherein the map is for a GNSS-denied environment.

15. The server computing device of claim 12, wherein the visual data is included in an image file formatted according to Exchangeable image file format (Exif).

16. The server computing device of claim 12, wherein the visual data is a video.

17. An apparatus comprising:
   means for receiving visual data captured by a camera coupled to a device, wherein the visual data is tagged with source identifying information associated with a wireless access point other than the device by including the source identifying information in metadata attached to the visual data, wherein the metadata describes attributes associated with the visual data;
   means for acquiring the source identifying information associated with the wireless access point from the metadata attached to the visual data;
   means for identifying at least one visual feature from the visual data;
   means for determining a coordinate on a map at which the visual data was acquired based on identifying the at least one visual feature from the visual data; and means for associating the coordinate on the map with the source identifying information associated with the wireless access point acquired from the metadata attached to the visual data.

18. The apparatus of claim 17, wherein the visual data is further tagged with one or more of signal strength of at least one wireless signal from the wireless access point measured at the device or a round-trip time derived using the at least one wireless signal from the wireless access point, and the apparatus further comprising means for acquiring, from the metadata attached to the visual data, the one or more of signal strength of the at least one wireless signal from the wireless access point or the round-trip time derived using the at least one wireless signal from the wireless access point; and means for associating the coordinate on the map with the one or more of the signal strength of the at least one wireless signal from the wireless access point or the round-trip time derived using the at least one wireless signal from the wireless access point.

19. The apparatus of claim 17, wherein the map is for a GNSS-denied environment.

20. The apparatus of claim 17, wherein the visual data is included in an image file formatted according to Exchangeable Image File Format (Exif).

21. The apparatus of claim 17, wherein the visual data is a video.

22. A non-transitory computer-readable storage medium, wherein the non-transitory computer-readable storage medium comprises instructions executable by a processor, the instructions comprising instructions to:

receive visual data captured by a camera coupled to a device, wherein the visual data is tagged with source identifying information associated with a wireless access point other than the device by including the source identifying information in metadata attached to the visual data, wherein the metadata describes attributes associated with the visual data;

acquire the source identifying information associated with the wireless access point from the metadata attached to the visual data;

identify at least one visual feature from the visual data;

determine a coordinate on a map at which the visual data was acquired based on identifying the at least one visual feature from the visual data; and associate the coordinate on the map with the source identifying information associated with the wireless access point acquired from the metadata attached to the visual data.

23. The non-transitory computer-readable medium of claim 22, wherein the visual data is further tagged with one or more of signal strength of at least one wireless signal from the wireless access point measured at the device or a round-trip time derived using the at least one wireless signal from the wireless access point, and the non-transitory computer-readable medium further comprising instructions to:

acquire, from the metadata attached to the visual data, the one or more of signal strength of the at least one wireless signal from the wireless access point or the round-trip time derived using the at least one wireless signal from the wireless access point; and associate the coordinate on the map with the one or more of the signal strength of the at least one wireless signal from the wireless access point or the round-trip time derived using the at least one wireless signal from the wireless access point.

24. The non-transitory computer-readable medium of claim 22, wherein the map is for a GNSS-denied environment.

25. The non-transitory computer-readable medium of claim 22, wherein the visual data is included in an image file formatted according to Exchangeable Image File Format (Exif).

26. The non-transitory computer-readable medium of claim 22, wherein the visual data is a video.

* * * * *